(12) United States Patent  (10) Patent No.: US 7,357,647 B1
McConnell et al.  (45) Date of Patent: Apr. 15, 2008

(54) ASSEMBLY FOR CONTROLLING A DEVICE

(75) Inventors: John E. McConnell, Ann Arbor, MI (US); John Stack, Shelby Township, MI (US); Jason Summerford, Dearborn, MI (US); Mary Trombley, Berkley, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 11/677,611

(22) Filed: Feb. 22, 2007

(51) Int. Cl.
*H01R 12/00* (2006.01)

(52) U.S. Cl. ........................................ 439/76.1; 439/34

(58) Field of Classification Search ................. 439/34, 439/76.1, 620.01, 620.22; 200/293, 303
See application file for complete search history.

(56) References Cited

U.S. PATENT DOCUMENTS

| | | |
|---|---|---|
| 4,315,114 A | 2/1982 | Monti, Jr. |
| 4,360,722 A | 11/1982 | Georgopulos |
| 4,613,736 A | 9/1986 | Shichijo et al. |
| 4,997,998 A | 3/1991 | Bauer |
| 5,012,054 A | 4/1991 | Rada et al. |
| 5,927,483 A | 7/1999 | Yamada |
| 6,080,940 A | 6/2000 | Rice |
| 6,388,559 B1 | 5/2002 | Cohen |
| 6,492,601 B1 | 12/2002 | Cain et al. |
| 6,555,774 B1 | 4/2003 | Nielsen |
| 6,964,532 B1 | 11/2005 | Lu |
| 7,071,434 B1 | 7/2006 | McConnell et al. |
| 7,288,007 B2 * | 10/2007 | Wu .............................. 439/638 |
| 7,291,036 B1 * | 11/2007 | Daily et al. .................. 439/487 |
| 7,293,998 B2 * | 11/2007 | Nagashima ................. 439/76.1 |
| 7,300,289 B2 * | 11/2007 | Glasson ..................... 439/76.1 |
| 2005/0002170 A1 | 1/2005 | Jacobs et al. |
| 2005/0017948 A1 | 1/2005 | Nguyen et al. |

* cited by examiner

*Primary Examiner*—Khiem Nguyen
(74) *Attorney, Agent, or Firm*—Brooks Kushman P.C.

(57) ABSTRACT

An assembly for controlling a device. The assembly includes a circuit board and a carrier. The carrier includes a first portion having a flexible arm and a second portion extending at an angle from the first portion. The circuit board extends between and is disposed adjacent to the first and second portions.

20 Claims, 3 Drawing Sheets

ASSEMBLY FOR CONTROLLING A DEVICE

BACKGROUND OF THE INVENTION

Field of the Invention

The present invention relates to an assembly for controlling a device.

SUMMARY OF THE INVENTION

In at least one embodiment of the present invention, an assembly for controlling device is provided. The assembly includes a circuit board and a unitary carrier. The unitary carrier includes a first portion and a second portion. The first portion has a flexible arm. The second portion extends at an angle from the first portion. The circuit board extends between and is disposed adjacent to the first and second portions.

In at least one other embodiment of the present invention, an assembly for controlling a device is provided. The assembly includes a circuit board and a unitary carrier. The unitary carrier includes a first portion and a second portion. The first portion defines an opening for receiving a flexible arm. The second portion extends from the first portion. The first and second portions contact the circuit board to hold the circuit board in position.

In at least one embodiment of the present invention, an assembly for controlling a device is provided. The assembly includes a vehicle trim component, a circuit board, and a unitary carrier. The unitary carrier is received by the vehicle trim component and includes a first portion and a second portion. The first portion defines an opening for receiving a button disposed on a flexible arm. The second portion extends from an end of the first portion. The circuit board extends generally perpendicular to the first portion. The circuit board extends from the first portion to the second portion and includes a switch disposed proximate the button. The first and second portions cooperate to hold the circuit board in position when the button contacts the switch.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
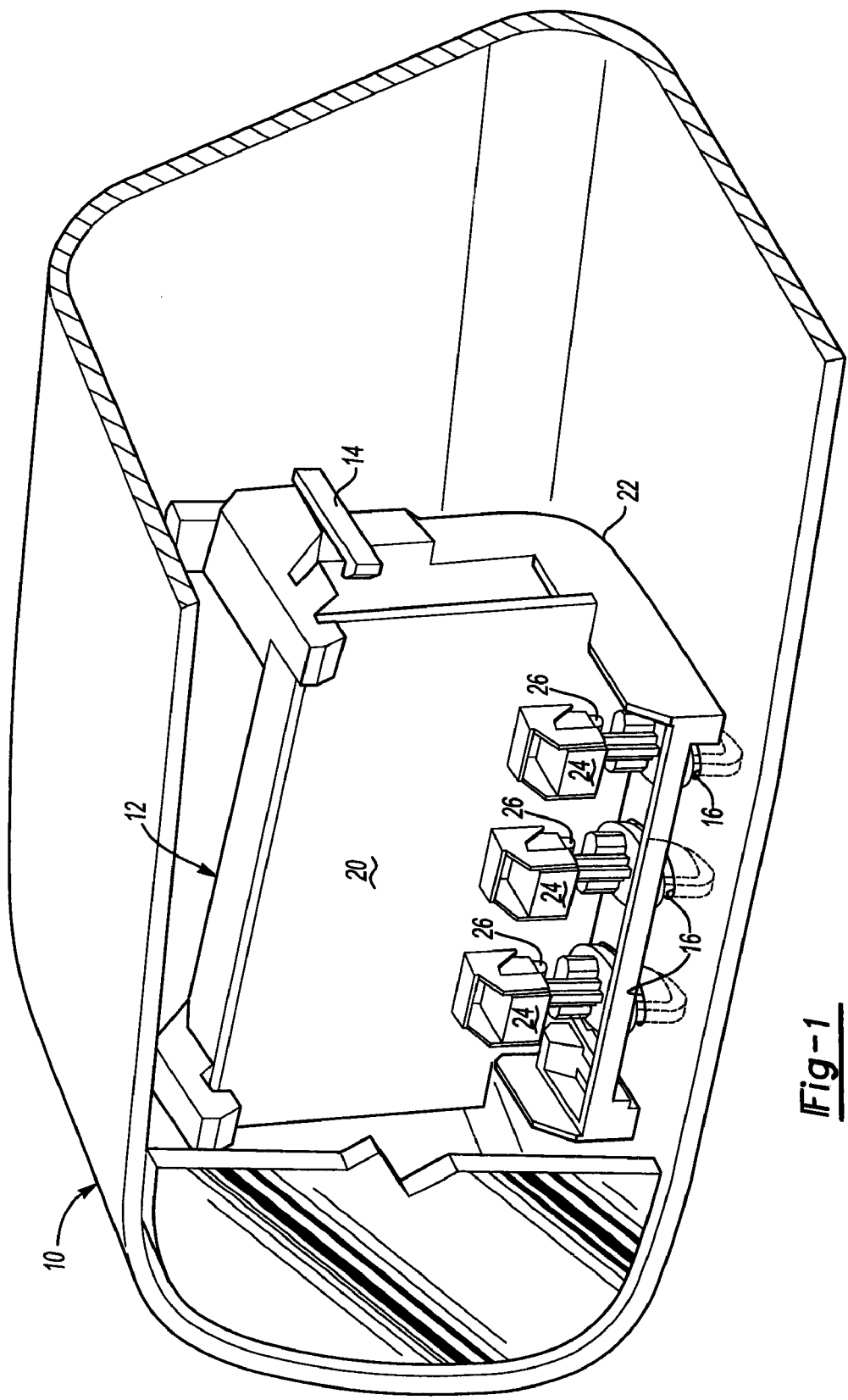
FIG. 1 is a perspective view of a component having an assembly for controlling a device.

Referring to FIG. 1, an exemplary component 10 is shown. In at least one embodiment, the component 10 may be a trim component for a motor vehicle. The component 10 may be of any suitable type. For example, in a vehicular context the component 10 may be a trim panel, control module, console, headliner, or other interior component. In the embodiment shown in FIG. 1, the component 10 is configured as a rear view mirror assembly.

The component 10 may be configured to receive an assembly 12 for controlling a device. The device may be of any suitable type. For instance, the device may be a remotely controlled device, such as a garage door opener or other actuator, or may be a directly controlled device that may be electrically coupled to the assembly 12, such as a switch, light, or control unit. In at least one embodiment, the component 10 may include one or more retaining features 14 for engaging or retaining the assembly 12 and may include one or more openings 16 that facilitate operation of the assembly 12 as will be discussed in more detail below.

The assembly 12 may include a circuit board 20 and a carrier 22. The circuit board 20 may have any suitable configuration. For instance, the circuit board 20 may rigid or flexible and may include various electrical components and/or circuitry that facilitate the selective control of a device. For example, the circuit board 20 may include one or more switches 24 and one or more light sources 26, such as a light emitting diode (LED). The circuit board 20 may also have any suitable shape. In the exemplary embodiment shown, the circuit board 20 may be generally planar and T-shaped.

Figure 2:
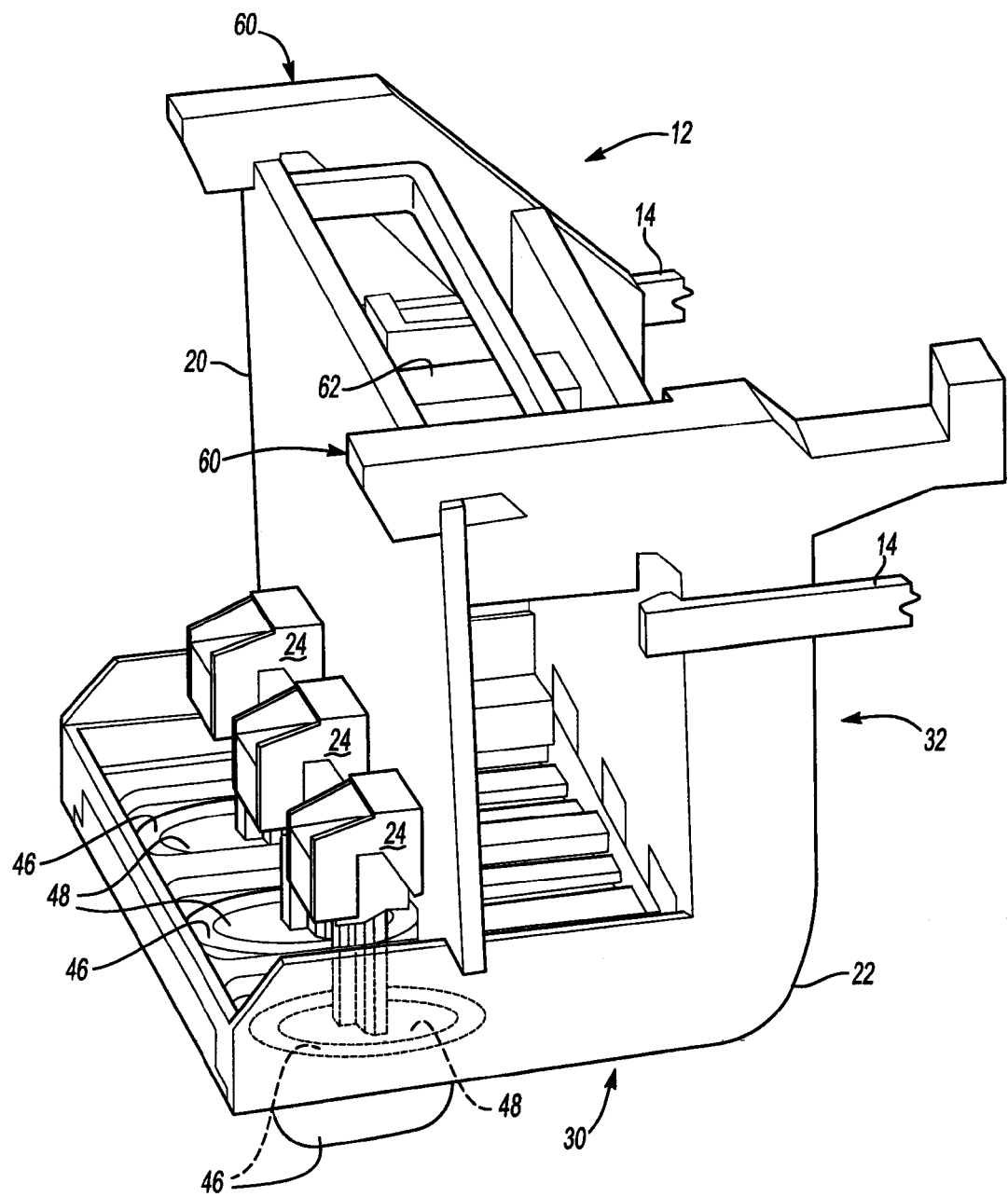
FIG. 2 is a perspective view of the assembly including a circuit board and a unitary carrier.
Figure 3:
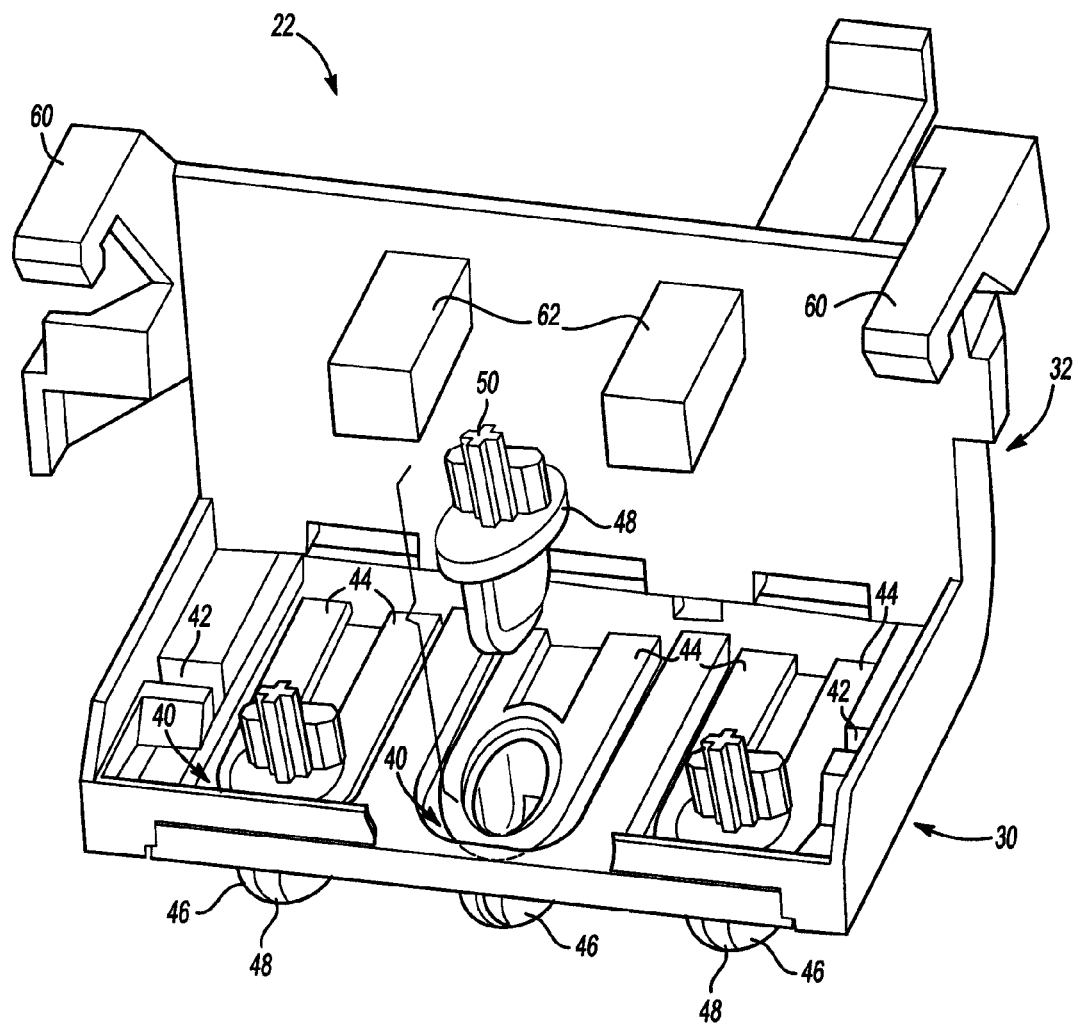
FIG. 3 is a perspective view of the assembly without the circuit board.

Referring to FIGS. 1-3, an exemplary carrier 22 is shown in more detail. The carrier 22 may receive and be operatively associated with the circuit board 20. In at least one embodiment, the carrier 22 may include a first portion 30 and a second portion 32. The first and second portions 30,32 may cooperate to help protect the circuit board 20 without enclosing the circuit board in a housing, thereby reducing package space and material costs and simplifying access for circuit board assembly. The carrier 22 may be made of any suitable material, such as a polymeric material and may be made by any suitable process, such as by injection molding. In at least one embodiment, the carrier 22 may be provided as a unitary component. As such, manufacturing and assembly costs, time, and complexity may be reduced.

The first portion 30 may have any suitable configuration. In at least one embodiment, the first portion 30 may be disposed adjacent to the component 10. The first portion 30 may at least partially define an opening 40. In addition, at least part of the first portion 30 may be adapted to engage or receive the circuit board 20. For example, the first portion 30 may include one or more slots 42 that may position and secure the circuit board 20 in a predetermined position and help inhibit movement of the circuit board 20 when a switch 24 is actuated.

The first portion 30 may also include one or more flexible cantilever arms 44. In at least one embodiment, a flexible cantilever arm 44 may extend from a side of the first portion 30 and toward or into the opening 40. One or more arms 44 may be associated with a button 46 and may flex when sufficient force is applied to the button 46. The arms 44 may have any suitable configuration. In at least one embodiment, such as that shown in FIG. 3, two generally parallel and planar arms 44 may associated with each button 46. The arms 44 may be provided in various lengths, thicknesses, and configurations to provide a desired amount of flexibility. In at least one embodiment, the arms 44 may extend from a side of the first portion 30 disposed proximate the second portion 32. As such, force may be directed at least partially toward the second portion 32 when a button 46 is actuated, which may allow the second portion 32 to help inhibit movement of the circuit board 20.

A button 46 may be associated with at least one arm 44. Any suitable number of buttons may be provided. In the embodiment shown, three buttons 46 are shown. The buttons 46 may have the same or different configurations and may be provided in any suitable location that facilitates an operative relationship with the circuit board 20. In at least one embodiment, each button 46 may be provided at or near a distal end of an arm 44. Moreover, the buttons 46 may be spaced apart from each other and arranged in a generally linear relationship in at least one embodiment of the present invention. In addition, one or more buttons 46 may extend at least partially through an associated opening 16 in the component 10.

A button 46 may be provided as a separate component or may be integrally formed with an arm 44. In at least one embodiment, at least a portion of one or more buttons 46 may integrally formed with at least one arm 44 to simplify manufacturing. In addition, at least a portion of a button 46 may be provided as a separate component or may be made of a material that differs from the first portion 30. For instance, a portion of a button 46 may be provided with a different material by employing a multi-shot injection molding process, such as a two-shot injection molding process. At least a portion of the button 46, such as that shown in FIG. 3, may be configured as a light pipe 48. The light pipe 48 may be made of polycarbonate or any other suitable material that permits light transmission and has sufficient dimensional stability. The light pipe 48 may be disposed proximate the light source 26 to illuminate or provide backlighting to an associated button 46.

An arm 44, button 46, or light pipe 48 may include a post 50 that may extend toward the circuit board 20. In the embodiment shown, a post 50 extends from a back surface of each button 46. The post 50 may be adapted to actuate a switch 24 and/or receive light from the light source 26. The post 50 may have any suitable configuration. In the embodiment shown, the post 50 is generally linear and at least partially extends through the opening 40 in the first portion 30.

The second portion 32 may be integrally formed and extend at an angle from the first portion 30. The second portion may extend at any suitable angle that permits operation of the assembly 12. In the embodiment shown, the second portion 32 extends generally perpendicular to the first portion 30. The second portion 32 may be configured to engage or receive the circuit board 20 and may be extend from an end of the first portion 30 in at least one embodiment of the present invention. In at least one embodiment, the second portion 32 may be generally planar and help protect the circuit board 20 from damage. In addition, the second portion 32 may engage or be received by a retaining feature 14 associated with the component 10 as is best shown in FIG. 1.

The second portion 32 may include first and second sets of locating features 60,62 that may engage first and second sides of the circuit board 20. For example, the first and second sets of locating features 60,62 may engage first and second sides of the circuit board 20 that are disposed opposite each other. Each set of locating features 60,62 may have one or more members.

The first and second sets of locating features 60,62 may locate the circuit board 20 along first and second axes, respectively. For example, the first and second axes may extend generally parallel to the second and first portions 32,30, respectively. In addition, the first set of locating features 60 may inhibit movement toward and/or away from the first portion 30 while the second set of locating features 62 may inhibit movement toward and/or away from the second portion 32.

In at least one embodiment, the first set of locating features 60 may be configured as retention arms that generally extend above the first portion 30. As such, the first set of locating features 60 may be configured to hold the circuit board 20 against the first portion 30. The first set of locating features 60 may include a mating feature 64, such as a groove that may receive and inhibit movement of the circuit board 20 in one or more directions. The mating feature 64 may be spaced apart from and aligned with a slot 42 in the first portion 30. In addition, the first set of locating features 60 may be configured to flex to enable installation or removal of the circuit board 20. At least a portion of each member of the first set of locating features 60 may extend generally parallel to the first portion 30 in at least one embodiment of the present invention.

The second set of locating features 62 may have any suitable configuration. In at least one embodiment, a member of the second set of locating features 62 may be configured as a post that is disposed adjacent to a side of the circuit board 20 to help resist movement of the board when a button 46 is pressed.

In at least one embodiment, the present invention permits an assembly 12 to be provided that accommodates limited package space environments. For instance, an assembly as described herein may be used in situations where a circuit board cannot be disposed directly behind and parallel to flexible arms 44 or where switches do not face away from a major planar surface of the circuit board. In addition, the present invention may help secure and protect a circuit board while accommodating load forces associated with button actuation.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An assembly for controlling a device, comprising:
   a circuit board; and
   a unitary carrier, including:
      a first portion having a flexible arm; and
      a second portion extending at an angle from the first portion;
   wherein the circuit board extends between and is disposed adjacent to the first and second portions.

2. The assembly of claim 1 wherein the second portion extends substantially perpendicular to the first portion.

3. The assembly of claim 1 wherein the assembly is disposed in a vehicle trim component.

4. The assembly of claim 3 wherein the vehicle trim component is a rear view mirror assembly.

5. The assembly of claim 3 wherein the vehicle trim component includes a retaining feature that engages the unitary carrier and the circuit board is configured to remotely control the device.

6. The assembly of claim 1 wherein the flexible arm further comprises a button disposed at a distal end.

7. The assembly of claim 6 wherein the button further comprises a light pipe and the circuit board further comprises a light source for transmitting light to the light pipe.

8. The assembly of claim 1 wherein the second portion further comprises first and second sets of locating features that engage first and second sides of the circuit board, respectively.

9. The assembly of claim 8 wherein first and second sets of locating features are disposed adjacent opposite sides of the circuit board.

10. The assembly of claim 1 wherein the first portion includes a slot for receiving the circuit board.

11. The assembly of claim 1 wherein the flexible arm extends away from the second portion.

12. An assembly for controlling a device, comprising:
a circuit board; and
a unitary carrier, including:
   a first portion that defines an opening for receiving a flexible arm; and
   a second portion extending from the first portion;
wherein the first and second portions contact the circuit board to hold the circuit board in position.

13. The assembly of claim 12 wherein the second portion extends from an end of the first portion.

14. The assembly of claim 12 wherein the circuit board extends generally perpendicular to the first portion.

15. The assembly of claim 12 wherein the second portion further comprises a retention arm that holds the circuit board against the first portion.

16. The assembly of claim 15 wherein the retention arm extends generally parallel to the first portion.

17. An assembly for controlling a device, comprising:
a vehicle trim component;
a circuit board; and
a unitary carrier received by the vehicle trim component, including:
   a first portion that defines an opening for receiving a button disposed on a flexible arm; and
   a second portion extending from an end of the first portion; and
a circuit board extending generally perpendicular to the first portion;
wherein the circuit board extends from the first portion to the second portion and includes a switch disposed proximate the button, wherein the first and second portions cooperate to hold the circuit board in position when the button contacts the switch.

18. The assembly of claim 17 wherein the second portion further comprises first and second sets of locating features for locating the circuit board along first and second axes, respectively.

19. The assembly of claim 18 wherein the first set of locating features engages first and second sides of the circuit board.

20. The assembly of claim 17 wherein the vehicle trim component is a rear view mirror assembly.

* * * * *